(12) United States Patent
Choi et al.

(10) Patent No.: US 10,843,128 B2
(45) Date of Patent: Nov. 24, 2020

(54) MEMBRANE CONTACTOR

(71) Applicant: Saudi Arabian Oil Company, Dhahran (SA)

(72) Inventors: Seung-Hak Choi, Dhahran (SA); Sarah N. Almahfoodh, Dhahran (SA); Sebastien A. Duval, Dhahran (SA); Abdulaziz Y. Ammar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 135 days.

(21) Appl. No.: 15/921,228

(22) Filed: Mar. 14, 2018

(65) Prior Publication Data

US 2019/0282954 A1 Sep. 19, 2019

(51) Int. Cl.
*B01D 53/22* (2006.01)
*B01D 53/14* (2006.01)
(Continued)

(52) U.S. Cl.
CPC ....... *B01D 53/229* (2013.01); *B01D 53/1412* (2013.01); *B01D 53/1425* (2013.01); *B01D 53/1462* (2013.01); *B01D 53/1493* (2013.01); *B01D 53/18* (2013.01); *C10L 3/103* (2013.01); *C10L 3/104* (2013.01); *B01D 2053/224* (2013.01); *B01D 2252/20405* (2013.01); *B01D 2252/20431* (2013.01);
(Continued)

(58) Field of Classification Search
CPC ............ B01D 53/1412; B01D 53/1425; B01D 53/1456; B01D 53/1462; B01D 53/1468; B01D 53/1475; B01D 53/18; B01D 53/22; B01D 53/228; B01D 53/229; B01D 2053/224; B01D 2256/245; B01D 2257/304; B01D 2257/504; B01D 2325/02; C10L 3/101; C10L 3/102; C10L 3/103; C10L 3/104
See application file for complete search history.

(56) References Cited

U.S. PATENT DOCUMENTS 6,165,253 A * 12/2000 Sirkar ................... B01D 53/14
96/6
2002/0014154 A1* 2/2002 Witzko ............... B01D 53/229
95/178
(Continued)

FOREIGN PATENT DOCUMENTS

WO WO 2012/123571 A1 9/2012

*Primary Examiner* — Jason M Greene
(74) *Attorney, Agent, or Firm* — Leason Ellis LLP (57) ABSTRACT

A membrane contactor for separating components from a feed gas stream comprises a housing, a feed gas inlet for receiving the feed gas stream at a first pressure, and a liquid inlet or receiving a stream of liquid at a second pressure, the liquid containing an absorbent for reacting components of the gas stream and a slip gas outlet. The contactor also includes a plurality of fibers with pore channels in contact with the feed gas incoming from the gas inlet on a first side, and in contact with liquid incoming from the liquid inlet on a second side, producing a gas-liquid interface at the pore channels. Liquid is prevented from wetting the pore channels by maintaining the first pressure of the gas stream higher than the liquid stream, and a portion of the gas stream bubbles through as slip gas into the liquid stream due to the elevated pressure.

11 Claims, 6 Drawing Sheets

(51) Int. Cl.
    *C10L 3/10*         (2006.01)
    *B01D 53/18*     (2006.01)

(52) U.S. Cl.
    CPC ............... *B01D 2252/20489* (2013.01); *C10L 2290/541* (2013.01); *C10L 2290/548* (2013.01)

(56) References Cited

U.S. PATENT DOCUMENTS

| | | | |
|---|---|---|---|
| 2009/0286296 A1 | 11/2009 | Hickey | |
| 2012/0247327 A1* | 10/2012 | Omole | B01D 53/1425 95/51 |
| 2014/0309471 A1* | 10/2014 | Zhou | B01D 53/229 585/802 |
| 2016/0206993 A1* | 7/2016 | Deng | B01D 53/1462 |

\* cited by examiner

MEMBRANE CONTACTOR

FIELD OF THE INVENTION

The present invention relates to gas separation, and in particular, relates to a membrane contactor system and apparatus for separating gas components from an input feed gas.

BACKGROUND OF THE INVENTION

In many petrochemical processes, gases are produced that are either harmful to release in the environment, or can be economically converted into a more useful or valuable product. One example is the removal of acid gas (hydrogen sulfide ($H_2S$) and carbon dioxide ($CO_2$)) from natural gas streams. Amine absorption is a common method used for the removal of acid gas in gas processing plants (among other applications). The absorption is based on the chemical reaction between the selected amine and gas molecules. These processes, while effective in gas sweetening, are energy intensive, costly, have a large footprint, and are subject to operation failures due to flooding and foaming. Membrane absorption processes are being proposed as an attractive alternative because membranes provide a large contacting area to volume ratio and are immune to unloading, flooding and foaming. Despite these advantages, membrane contactors are still not considered a reliable replacement to absorption because of the gradual wetting that occurs in membrane pores. Wetting occurs when liquid absorbent penetrates the pores of the membrane, partially or entirely. Wetting causes a significant increase of mass transport resistance between the two phases (gas and liquid) which reduces the reaction rate between absorbent and acid gas on either side of the membrane. Over time, pore wetting typically results in severe degradation of membrane performance. According to some research, membrane resistance can be up to 60% of the total mass transfer resistance even when the membrane has marginal wetting (e.g., <2%).

To date, while various membrane contactors have been proposed, wetting, in different degrees, has been observed in all membrane contactor applications. Suggested methods to prevent and/or reduce wetting have focused on membrane surface modifications, absorbent-membrane selection, and controlling membrane morphology. These methods can greatly limit the potential applications for membrane contactors because the solutions provided are tailored to specific liquid compositions and membrane morphologies, and fail to provide a more universal solution to wetting. Another technique that has been proposed is the use of composite membranes with a selective top layer designed to prevent wetting. The addition of a dense/protective layer, however, can increase resistance to mass transfer, ultimately leading to higher operation pressure requirements.

It would therefore be advantageous to provide a membrane contactor that is adaptable for a variety of applications, the effectiveness of which is not as adversely degraded by pore wetting.

SUMMARY OF THE INVENTION

Embodiments of the present invention provide a membrane contactor for separating components from a feed gas stream. The membrane contactor comprises a housing, a feed gas inlet port coupled to the housing for receiving the feed gas stream at a first pressure, and a liquid inlet port in the housing for receiving a stream of liquid at a second pressure, the liquid containing an absorbent for reacting with components of the gas stream. The membrane contactor further includes a plurality of membrane fibers with pore channels through the wall of the fibers, the plurality of fibers in contact with the feed gas incoming from the gas inlet on a first side, and in contact with liquid incoming from the liquid inlet on a second side, producing a gas-liquid interface at the pore channels, and a slip gas outlet in the housing. The liquid is prevented from wetting the pore channels by maintaining the first pressure of the gas stream higher than the pressure of the liquid stream, and a portion of the gas stream bubbles through as slip gas into the liquid stream due to the elevated pressure. The membrane contactor also includes a feed gas outlet port and a liquid outlet port.

In some embodiments, the housing of the contactor includes a main body containing the plurality of membrane fibers, a first contactor head including the feed gas inlet port, and a second contactor head including the feed gas outlet port. The absorbent in the liquid stream can be an amine based compound that selectively reacts with $H_2S$ and $CO_2$. Preferably, the plurality of membrane fibers include pores channels of varying diameters, and the first pressure of the gas is maintained at a level in which majority of bubbling occurs in the pore channels having relatively large diameters.

Embodiments of the present invention also include a system for acid gas removal. The system comprises a membrane contactor having a plurality of membrane fibers in which a feed gas pressure is maintained above a liquid absorbent pressure allowing a portion of slip gas to bubble through the liquid absorbent, feed gas inlet and outlet ports coupled to the membrane contactor for providing a flow of feed gas through the membrane contactor, liquid stream inlet and outlet ports coupled to the membrane contactor for providing a flow of liquid absorbent through the membrane contactor, a first control valve for controlling an interface between liquid in the contactor and slip gas to ensure that plurality of fibers remain immersed in the liquid stream. A second control valve for controlling an interface between feed gas and entrained liquid at the feed gas outlet port to ensure that a level of entrained liquid remains low, and a slip gas outlet for removing the bubbled slip gas from the contactor In some embodiments, the system includes a first level sensor configured to measure the interface between the liquid in the contact and the slip gas and to communicate a signal indicative of the interface level to the first level sensor, and a second level sensor configured to measure the interface between the feed gas and entrained liquid at the gas outlet port and to communicate a signal indicative of the interface level to the second control valve.

In some implementations, the system further comprising a blower coupled to the slip gas outlet adapted to pressurize slip gas exiting through the slip gas outlet and to redirect the pressurized slip gas back to the gas inlet of the membrane contactor. In other implementations, a flash drum coupled to the slip gas outlet is adapted to separate liquid and gas phases, wherein slip gas exiting from the slip gas outlet is combined with gas flashed from the flash drum. Alternatively, slip gas is routed to a regenerator including a stripper portion that strips of the gas components from the amines by application of heat. The slip gas exiting from the slip gas outlet can be combined with stripped gas components from the stripper portion of the regenerator.

Embodiments of a method of separating components from a feed gas stream are also provided. The method includes supplying the feed gas stream at a first pressure to a first side of a membrane contactor having a plurality of membrane fibers with pore channels, supplying a liquid absorbent stream at a second pressure to a second side of the membrane contactor, and contacting the feed gas stream with the liquid absorbent stream at the pore channels of the plurality of membrane fibers to selectively remove components from the feed gas stream into the liquid stream. The first pressure of the feed gas is set higher than the second pressure of the liquid absorbent to prevent wetting of the pore channels, and a portion of the feed gas bubbles through the liquid absorbent in the membrane contact as a result of the elevated feed gas pressure.

In some embodiments, the method includes redirecting slip gas from the membrane contactor back to the feed gas stream. The liquid absorbent can include an amine based component for selectively removing $H_2S$ and $CO_2$ from the feed gas stream. In some implementations, a liquid level within the membrane contact to maintain the plurality of membrane fibers immersed in the liquid absorbent stream.

These and other features can be appreciated from the accompanying description of certain embodiments of the invention which are discussed in relation to the accompanying drawing figures.

DETAILED DESCRIPTION CERTAIN OF EMBODIMENTS OF THE INVENTION

The embodiments of a membrane contactor apparatus and system disclosed herein address the difficulties posed by wetting by maintaining gas phase feed pressure above the liquid absorbent pressure. By precisely controlling the gas and liquid phase pressures, wetting can be minimized or partially prevented. While the elevated gas feed pressure can cause bubbling of gas into the liquid absorbent through the larger membrane pores, it is found that the bubbling can be suitably handled, and that the reduction or elimination in wetting outweighs the bubbling effect, and improves overall process performance.

Figure 1:
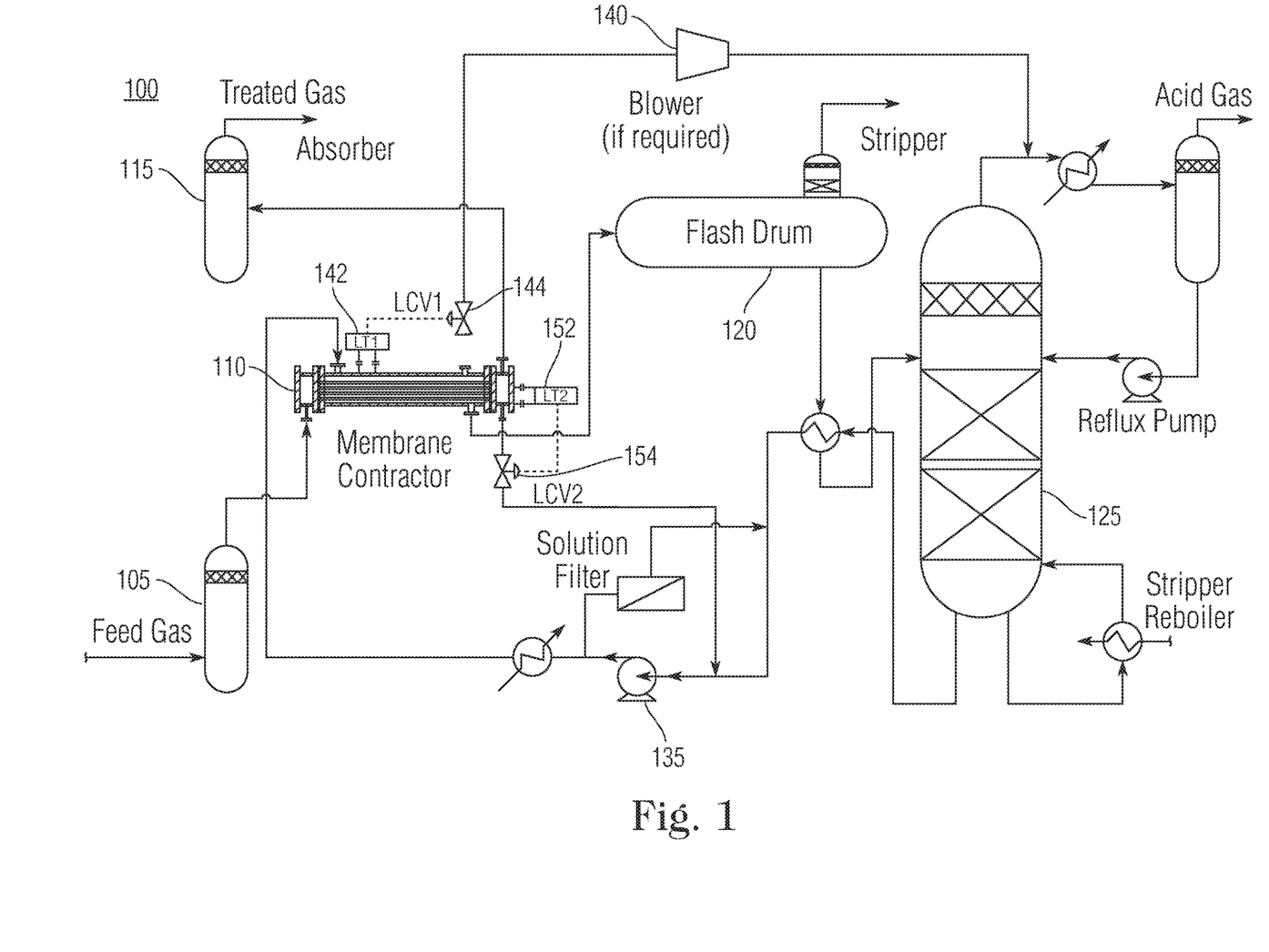
FIG. 1 is a schematic diagram of a gas component separation system that employs a membrane contactor according to an embodiment of the present invention.

FIG. 1 is a schematic diagram of an example system for acid gas removal that employs a membrane contactor according to an embodiment of the present invention. In the system 100, a feed gas stream 105, including components to be selectively removed, such as acid gases (e.g., $H_2S$, $CO_2$), is fed to a membrane contactor 110. As described in greater detail below, the membrane contact includes a gas side, supplied by the feed gas stream 105, and an absorbent liquid side including a liquid phase fluid stream. The gas and liquid sides in the membrane contactor 110 are separated by membrane fibers having microscopic pores. Within the pores of the membrane a selective mass transfer occurs, through which the acid gases are removed from the feed gas stream.

Figure 2:
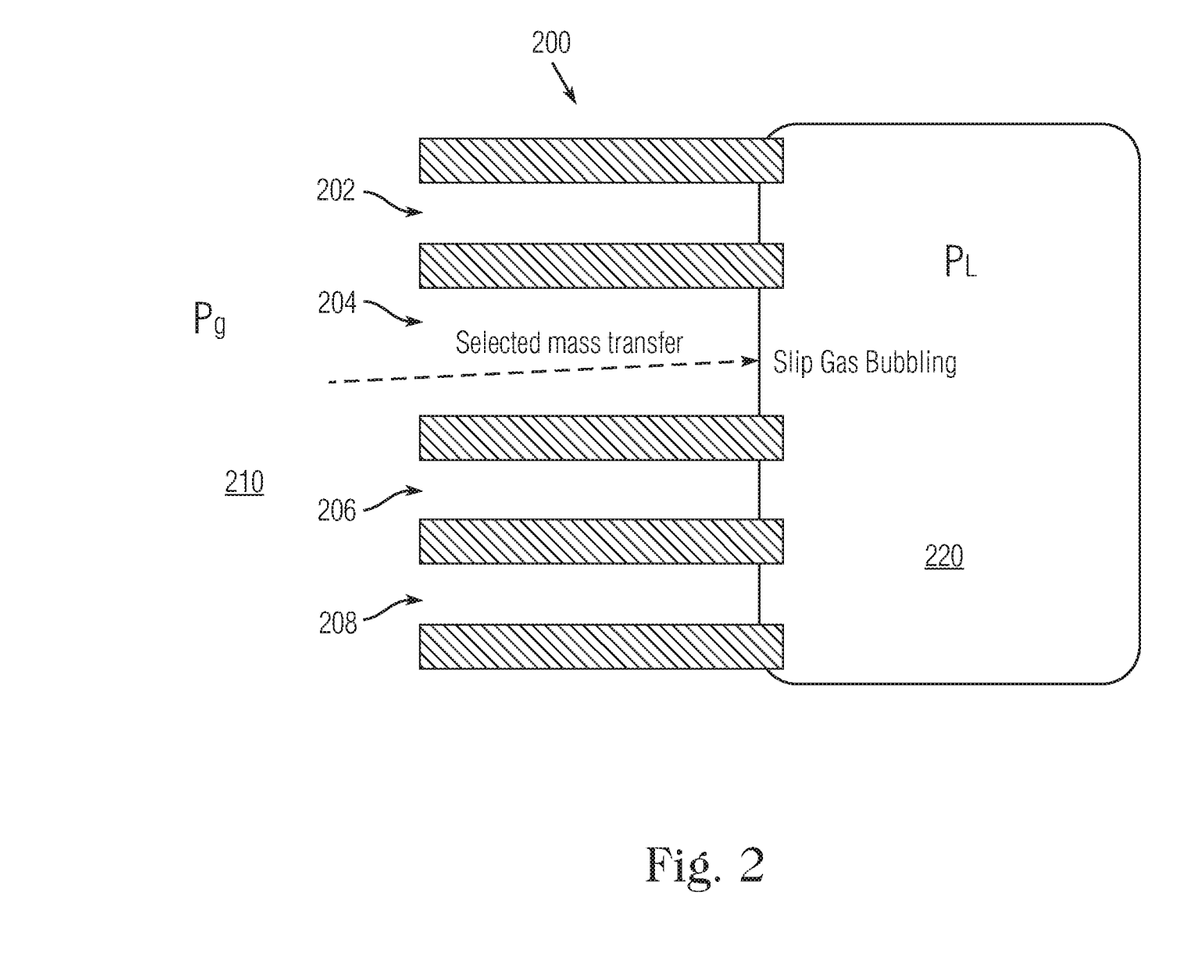
FIG. 2 is a schematic view showing pore channels between the feed gas side and liquid side of a membrane contactor according to an embodiment of the present invention.

Reference is now made to FIG. 2, which schematically illustrates this selective mass transfer process. A membrane 200, including pore channels 202, 204, 206, 208 is positioned between the feed gas 210 and absorbent liquid 220. The liquid absorbent 220 includes one or more compounds that react with the acidic components of the feed gas at the feed-gas/liquid interface at the edge of pore channels 202, 204, 206, 208. Suitable compounds include amines such as diethanolamine (DEA) and methyldiethaonalamine (MDEA). In the illustration shown in FIG. 2, the membrane material is hydrophobic, and the pressure on the feed gas side of the membrane channels ($P_g$) is set and maintained at a level higher than the pressure on the liquid phase side ($P_L$), with the result that the liquid absorbent only contacts the edges of the pores and does not advance into the pore channels. In this manner pore wetting is prevented at the cost of some amount of the feed gas bubbling through into the liquid absorbent. Typical values of $P_g$ are about 29 psig for acid gas enrichment and 25 psig for tail gas treatment.

The pore channels can range in diameter from about 0.02 μm to about 2 μm. Additionally, the pore channel widths are not necessarily uniform within the fiber bundle, and in some embodiments, it is preferable implement the membrane with a variation in pore channel diameter of about 0.02 μm to about 0.5 μm. For example, as illustrated in FIG. 2, pore channel 204 has a greater diameter than pores channels 202, 206 and 208. The variation in pore channel size provides flexibility to set the gas side pressure to promote bubbling in some (e.g., larger) pores than others, as is explained further below. For example, the gas pressure can be set so that the likelihood of bubbling is high in relatively wide pore channels, but not in narrower pore channels. In this way, through knowledge of the relative numbers of large and small pore channels in the membrane, the amount of bubbling (gas slippage) can be estimated.

Returning again to FIG. 1, a "sweetened" gas stream, containing gas from which acids have been removed by the liquid absorbent, exits from a gas outlet port of the membrane contactor and flows to a K—O-Drum 115, which further collects entrained liquid from the gas stream. As the gas phase is sweetened, the liquid is correspondingly enriched in the acidic components absorbed from the gas. In addition, according to embodiments of the present invention, the liquid stream will tend to contain a substantial amount of bubbled, unabsorbed feed gas, referred to as slip gas, due to the elevated gas-side pressure. It is desirable to remove the gases from the liquid absorbent, so that, for example, the slip gas can be recycled back to the membrane contactor. This enriched liquid stream exits from a liquid outlet of the membrane contactor and flows to a flash drum 120, which is a vapor-liquid separator removes undissolved or non-bonded gases (e.g., $CH_4$, $C_2+$ and $N_2$) entrained in the liquid stream. The liquid phase output of the flash drum is conducted to a reboiler portion of regenerator 125. In the reboiler, heat is applied at temperatures of about 100° C. to about 160° C. to boil off acid gases from the liquid absorbent. The process effectively removes (strips) the removed gas components, such as $H_2S$ and $CO_2$ previously bonded to the liquid absorbent. Some of the slip gas removed during the process stages can be recycled back to the feed gas supply.

As noted, the process flow is designed such that the feed gas pressure is higher than liquid pressure. A liquid circulation pump 135, coupled to the liquid outlet of the membrane contactor, can be used to control flow rate and discharge pressure by control of a bypass line. In some implementations, a centrifugal pump can be employed as the liquid circulation pump. If the feed gas pressure ($P_g$) is very low by nature of the process (e.g., in the tail gas of sulfur recovery or in acid gas from an amine regenerator), a blower 140 can be used to compensate for any pressure losses in the gas and liquid piping and vessels, while maintaining gas pressure above liquid. Those of skill in the art can estimate the pressure loss for liquid lines and gas lines, effect of elevation etc. to determine a suitable blower size to ensure that gas pressure above liquid pressure in all parts of the membrane contactor.

A first liquid level sensor (LT1) 142 is a liquid level sensor configured to measure the level of liquid in the membrane contactor 110. The liquid level of LT1 also indicates the level of the interface between liquid and slip gas in the membrane contactor. A first level control valve (LCV1) 144 is configured to control the interface between the liquid absorbent and slip gas to ensure that the pores of the membrane fibers remain immersed in liquid absorbent. A second liquid level sensor (LT2) 152 measures the level of liquid in the membrane contactor head (shown in FIG. 1), and hence, the interface between entrained absorbent and gas in the contactor head. A second liquid control valve (LCV2) 154 is configured to maintain a low liquid level and to route liquid to the liquid circulation pump 135 for recycling liquid back to the liquid inlet of the contactor. The pressure in the membrane contactor heads is at feed gas pressure and no pump is necessary to lower the liquid level.

Figure 3:
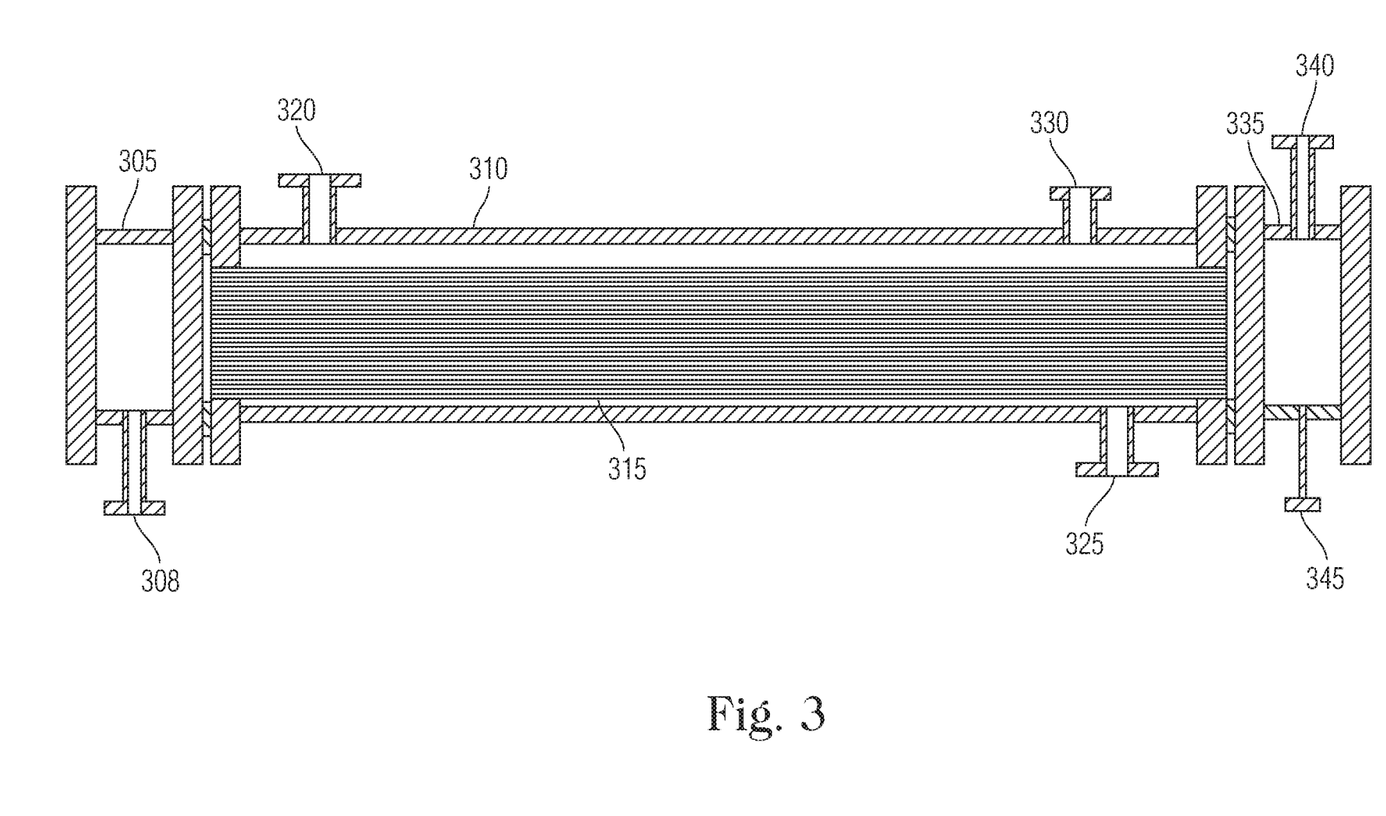
FIG. 3 is a cross-sectional view of an embodiment of a membrane contactor according to the present invention.

FIG. 3 is a cross-sectional view of an embodiment of a membrane contactor 110 according to the present invention. As shown, the membrane contactor is generally cylindrical and is elongated along a longitudinal axis (L), but this shape is exemplary and the contactor design is not limited to this configuration. A first contactor head 305 is positioned at a first longitudinal end of the contactor. The first contactor head includes gas inlet port 308 connected to the feed gas supply. The internal space enclosed by the first contactor head is at feed gas pressure. A passageway leads from the contactor head 305 to the inside of contactor housing 310 in which a plurality of membrane fibers 315 is arranged. In some implementations, the fibers 315 are oriented along the longitudinal axis of the contactor, as shown. The passageway from the contactor head can lead to into the lumen of the fibers. The contactor housing 310 includes a liquid inlet port 320 through which liquid absorbent, under pressure, flows into the contactor, and a liquid outlet port 325 on the opposite side of the housing. Contactor housing 310 also includes a slip gas outlet 330 that provides an exit path for gases that bubble through the liquid absorbent due to the elevated gas pressure. A second contactor head 335 is positioned at a second longitudinal end of the membrane contactor, opposite from the first contactor head 305. The second contactor head 335 includes a gas outlet port 340 through which the flow of feed gas exits the membrane contactor, and a liquid entrainment drain 345 for liquid absorbent that becomes entrained in the flow of the feed gas. The membrane contactor can also include baffles (not shown in FIG. 3) to induce turbulence and enhance mass transfer.

In operation, gas enters the membrane contactor by the gas inlet port 308, travels inside the membrane fibers 315 and exits at the gas outlet port 340. Absorbent enters the membrane contactor from the liquid inlet port 320 and exits at the liquid outlet port 325. In contrast to the gas which enters on the lumen side of the membrane fibers, the liquid enters on the external side of the fibers. Within the membrane fiber section, gas and absorbent come into contact in the pores of the membrane fibers. Acid gases are selectively removed from the gas by the selective absorbent. Since the gas phase has higher pressure than the liquid phase, a small amount of feed gas can escape though the pores. The slip gas migrates to the upper section of the membrane contactor. The liquid level control valve ensures that the fibers are immersed in liquid, and enables withdraw of the slip gas.

Figure 4:
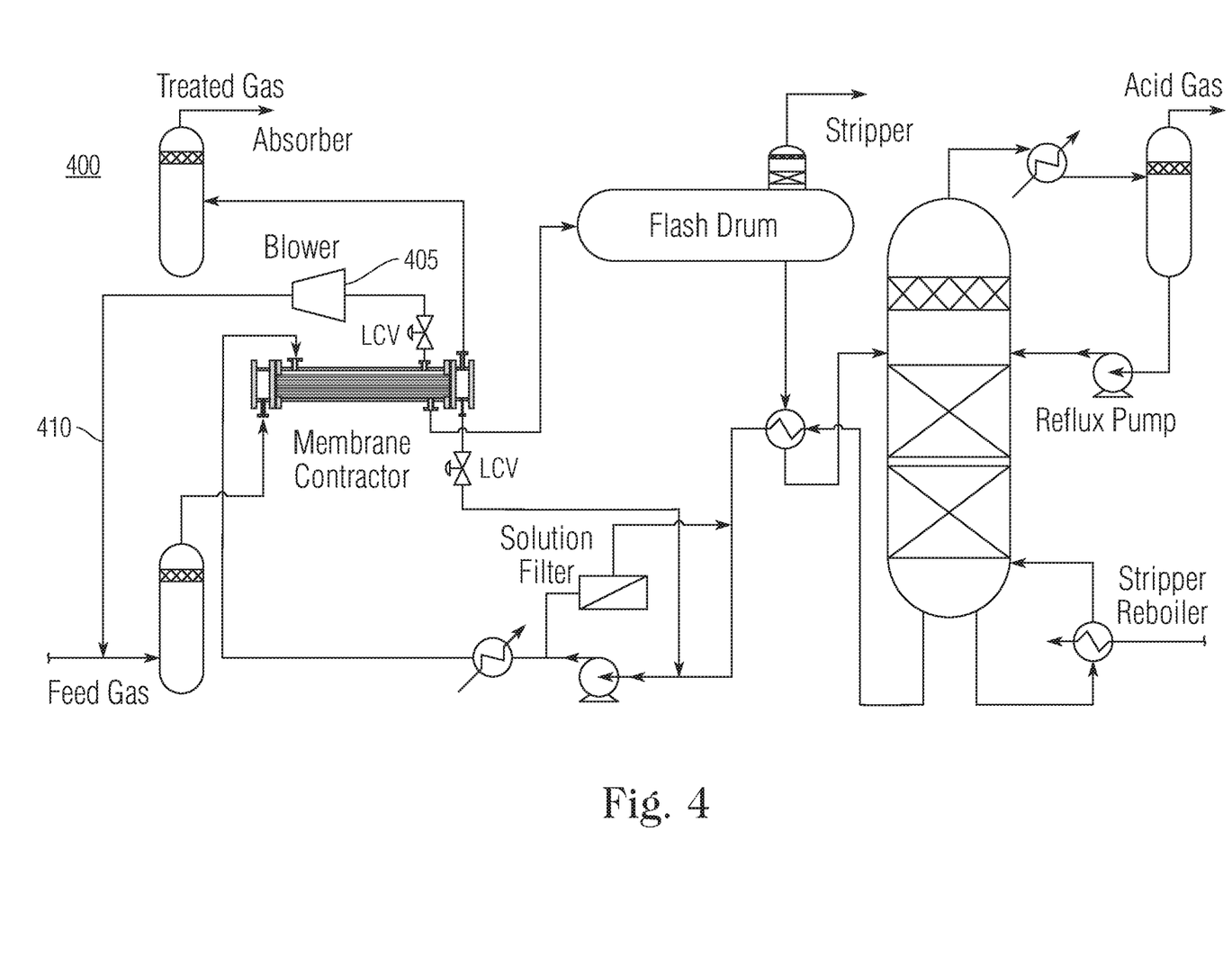
FIG. 4 is a schematic diagram of another embodiment of a gas component separation system according to the present invention.
Figure 5:
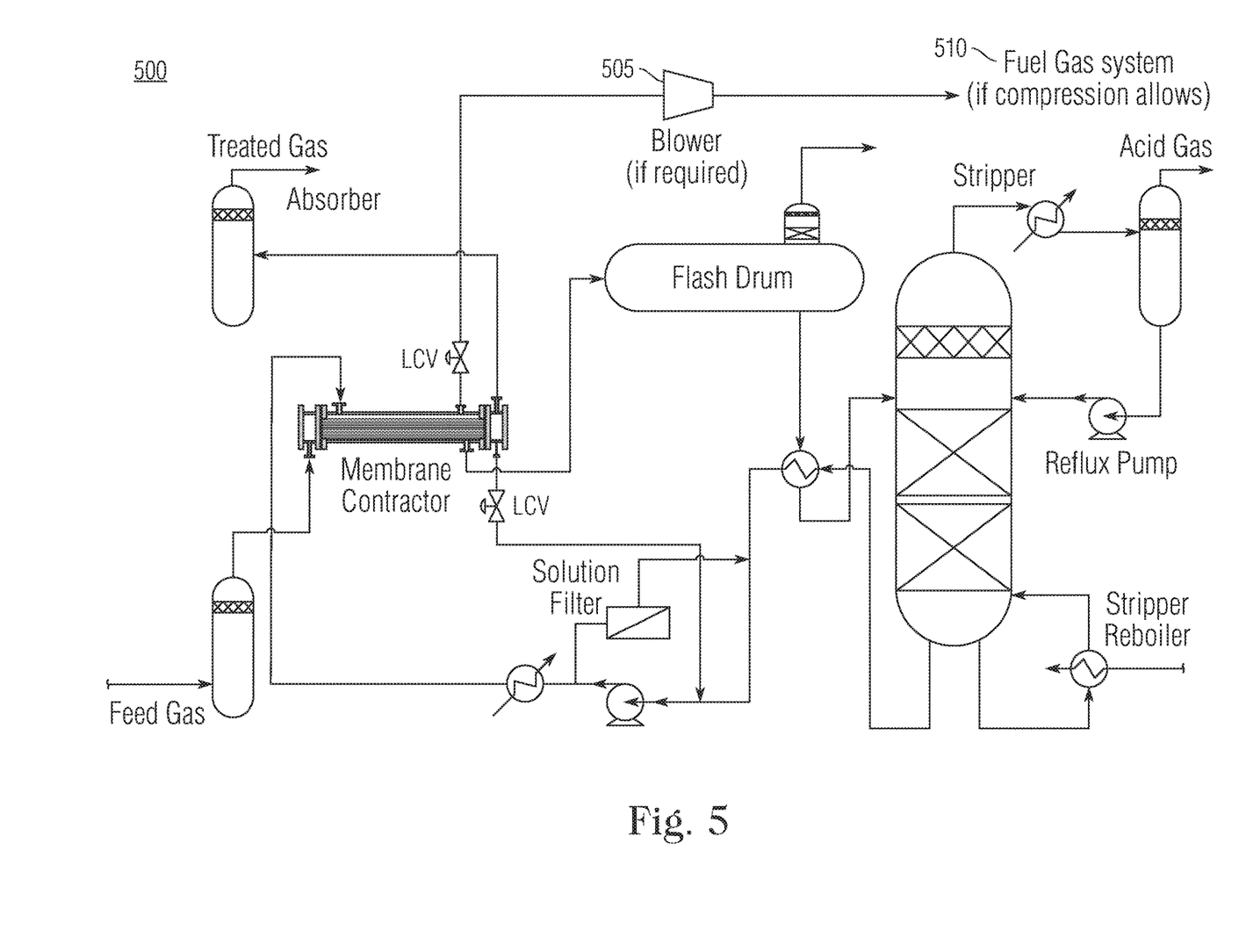
FIG. 5 is a schematic diagram of another embodiment of the gas component separation system according to the present invention.

The slip gas can be rerouted and reused in different ways, depending the on the specifications of the separation system. In the embodiment of FIG. 1, the slip gas is combined with the stripped gas from the stripper section of the regenerator 125 (shown in FIG. 1). In an alternative embodiment of a separation system 400, shown in FIG. 4, the separation system is modified to include a blower 405 coupled to the slip gas output port of the membrane contactor. The blower forces the slip gas through a return line 410 to the feed gas input. This embodiment is particularly suited to acid gas enrichment and tail gas treatment processes in which pressure differences between inlet and outlet pressure are not large, for example, about 1 to about 30 psi. In certain embodiments, if the slip gas composition matches the fuel gas quality requirements, the slip gas can be routed via a blower 505 to a fuel gas system 510 as shown in the modified system 500 of FIG. 5. In addition, for acid gas removal applications, the slip gas can be combined with the flash gas from the flash drum 120 (in FIG. 1).

Figure 6:
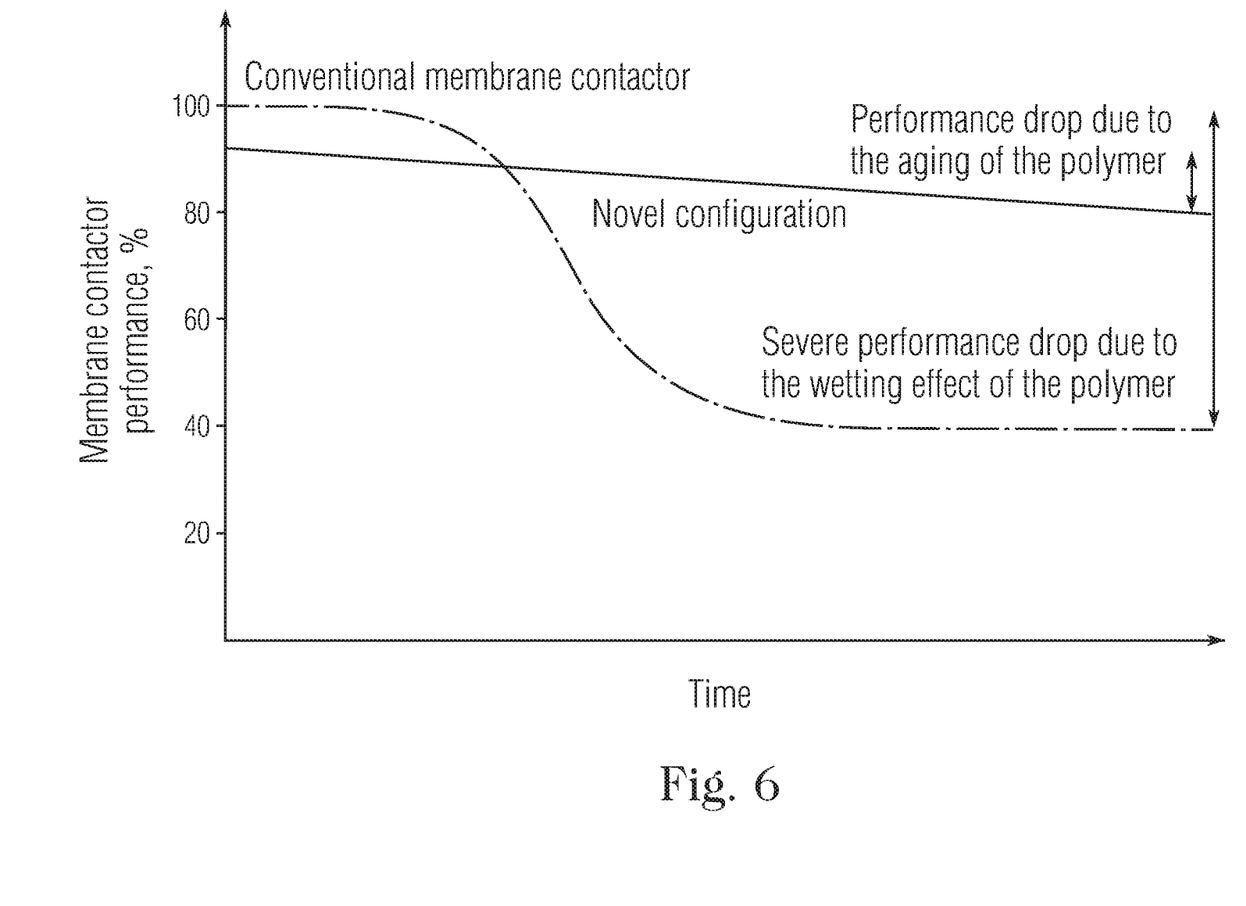
FIG. 6 is a graph comparing membrane contactor performance over time of the membrane contactor according to the present invention and prior art contactors.

FIG. 6 is a graph comparing membrane contactor performance over time of the membrane contactor according to the present invention and prior art contactors. As indicated in the graph, the efficiency of membrane contactors according to the present invention is lower initially because of the small fraction of gas that penetrates the membrane fibers and does not undergo chemical reactions with the absorbent. However, over time the efficiency of prior art contactors degrades significantly due to pore wetting, from near 100% down to 50%. In contrast, the membrane contactors of the present invention decline in performance only marginally due to the proactive prevention of wetting, eventually reaching about 80-85% efficiency.

The following example indicate application in which the membrane contactor can be advantageously used as the slippage rates do not appreciably affect their effectiveness.

Example 1: Acid Gas Enrichment (AGE)

An example acid gas enrichment operation at varies has an acid gas stream with the following composition ($H_2S$: 23%, $CO_2$ 75%, $CH_4$ 0.5% and $H_2O$ 1.5%). The goal of the operation is to subject the feed gas to an amine (MDEA) based acid gas enrichment in order to elevate $H_2S$ content to at least 40% to meet the specifications of a sulfur recovery unit (SRU). The enrichment rates for various slippage rates are shown in Table 1 below. As indicated, conventional methods, including MDEA and a classical column contactor, have been able to increase $H_2S$ content to 52.6%.

TABLE 1

| Slippage (% of feed) | $H_2S$ content (%) in combined stream (stripper + vent from membrane contactor) |
|---|---|
| 0 | 52.6 |
| 1 | 52.0 |

TABLE 1-continued

| Slippage (% of feed) | H$_2$S content (%) in combined stream (stripper + vent from membrane contactor) |
|---|---|
| 5 | 49.4 |
| 10 | 46.6 |
| 15 | 44.1 |
| 20 | 41.8 |
| 25 | 39.8 |

The data above demonstrates that that a slippage of up to five percent for the purpose of preventing pore wetting only reduces the H$_2$S enrichment by about 3 percent. Moreover, to meet the goal of 40% H$_2$S enrichment, the slippage rate can reach as high 20%. Accordingly, the membrane contactor of the present invention is particularly suited to H$_2$S enrichment processes, as they are relatively insensitive to modest slippage rates. For enrichment process, over the long-term benefits of preventing wetting, and thereby improving long-run contactor performance, clearly outweighs the costs due to gas slippage.

Example 2: Tail Gas Treatment (TGT)

Tail gas treatment is another process to which the membrane contactor of the present invention is particularly suited. In an exemplary tail gas treatment, an acid gas stream having the following composition (H$_2$S: 70%, CO$_2$ 29.9%, organic impurities 1,000 ppm dry basis) is sent to a sulfur recovery unit, where a sulfur recovery of 99% is obtained. The tail gas is subjected to hydrogenation, and H$_2$S and co-absorbed CO$_2$ are recycled back to sulfur recovery unit. The absorbent for H$_2$S removal from the tail gas can co-absorb CO$_2$ to ensure proper H$_2$S removal. A minimal level of H$_2$S (approximately 31% vs inert (CO$_2$+N$_2$)) is required to ensure high enough temperatures to fully degrade organic impurities (e.g., benzene, toluene, etc.) and prevent degradation of catalytic converter performance. Table 2 shows H$_2$S content obtained at various slippage rates.

TABLE 2

| Slippage (% of feed) | H$_2$S content (%) in combined stream (acid gas + stripper + vent from membrane contactor) |
|---|---|
| 0 | 36 |
| 1 | 35 |
| 5 | 34 |
| 10 | 32 |
| 12 | 31 |
| 15 | 30 |

The data in the table above indicates that a slippage of few percent to avoid wetting of the pore is providing enough H$_2$S recovery. The slippage can reach as high as 12% and still maintain H$_2$S content above the desired value of 31% H$_2$S vs inert (CO$_2$+N$_2$) in normal air (non-O$_2$-enriched air) operation.

The membrane contactor of the present invention has been described above as applied to acid gas removal (AGR), acid gas enrichment (AGE) and tail gas treatment processes (TGT). However, the membrane contact can also be used in other applications including, for example, methane/nitrogen separation with lean oil and separations involving physical solvents for bulk acid gas removal. In addition, as the membrane contactor design is modular, additional contactors can be added to provide additional component separation whenever suitable. For example, in the case of a malfunction of a sulfur recovery unit, more H$_2$S and CO$_2$ will be present in the tail gas than normal. In this case, one or more additional contactors can be used to treat the tail gas.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A membrane contactor for separating components from a feed gas stream comprising:
 a housing;
 a feed gas inlet port coupled to the housing for receiving the feed gas stream at a first pressure;
 a liquid inlet port in the housing for receiving a stream of liquid at a second pressure, the liquid containing an absorbent for reacting with components of the gas stream;
 a plurality of membrane fibers with pore channels, the plurality of fibers in contact with the feed gas incoming from the gas inlet on a first side, and in contact with liquid incoming from the liquid inlet on a second side, producing a gas-liquid interface at the pore channels;
 a slip gas outlet in the housing for releasing a slip gas that bubbles into the liquid stream;
 a feed gas outlet port and a liquid outlet port;

a first level sensor coupled through the housing and configured to measure the interface between the liquid in the contactor and the slip gas and to communicate a signal indicative of the interface level to the first control valve; and a second level sensor coupled through the housing and configured to measure the interface between the feed gas and entrained liquid at the gas outlet port and to communicate a signal indicative of the interface level to the second control valve, wherein the liquid is prevented from wetting the pore channels by maintaining the first pressure of the gas stream higher than the pressure of the liquid stream, and wherein the slip gas bubbles into the liquid stream due to the elevated pressure.

2. The membrane contactor of claim 1, wherein the housing of the contactor includes a main body containing the plurality of membrane fibers, a first contactor head including the feed gas inlet port, and a second contactor head including the feed gas outlet port.

3. The membrane contactor of claim 1, wherein the absorbent in the liquid stream is an amine based compound that selectively reacts with $H_2S$ and $CO_2$.

4. The membrane contactor of claim 1, wherein the plurality of membrane fibers include pore channels of varying diameters, and the first pressure of the gas is maintained at a level in which majority of bubbling occurs in the pore channels having relatively large diameters.

5. A system for acid gas removal comprising:
a membrane contactor having a plurality of membrane fibers in which a feed gas pressure is maintained above a liquid absorbent pressure allowing a portion of a slip gas to bubble through the liquid absorbent;
feed gas inlet and outlet ports coupled to the membrane contactor for providing a flow of feed gas through the membrane contactor;
liquid stream inlet and outlet ports coupled to the membrane contactor for providing a flow of liquid absorbent through the membrane contactor;
a first control valve for controlling an interface between liquid in the contactor and the slip gas to ensure that plurality of fibers remain immersed in the liquid stream;
a second control valve for controlling an interface between feed gas and entrained liquid at the feed gas outlet port to ensure that a level of entrained liquid remains low;
a slip gas outlet for removing the bubbled slip gas from the contactor;
a first level sensor configured to measure the interface between the liquid in the contactor and the slip gas and to communicate a signal indicative of the interface level to the first control valve; and
a second level sensor configured to measure the interface between the feed gas and entrained liquid at the gas outlet port and to communicate a signal indicative of the interface level to the second control valve; and
a blower coupled to the slip gas outlet adapted to pressurize slip gas exiting through the slip gas outlet and to redirect the pressurized slip gas back to the gas inlet of the membrane contactor.

6. The system of claim 5, further comprising a flash drum coupled to the slip gas outlet adapted to separate liquid and gas phases, wherein slip gas exiting from the slip gas outlet is combined with gas flashed from the flash drum.

7. The system of claim 5, further comprising a regenerator including a stripper portion adapted to receive liquid absorbent including amines bonded to separated feed gas components and to strip of the gas components from the amines by application of heat.

8. The system of claim 7, wherein slip gas exiting from the slip gas outlet is combined with stripped gas components from the stripper portion of the regenerator.

9. A method of separating components from a feed gas stream comprising:
supplying the feed gas stream at a first pressure to a first side of a membrane contactor having a plurality of membrane fibers with pore channels;
supplying a liquid absorbent stream at a second pressure to a second side of the membrane contactor, wherein the second pressure of the liquid absorber being lower than first pressure of the feed gas in order to prevent wetting of the pore channels and a portion of the feed gas bubbles through the liquid absorbent in the membrane contactor as a slip gas due to the differential between the first and second pressure;
contacting the feed gas stream with the liquid absorbent stream at the pore channels of the plurality of membrane fibers to selectively remove components from the feed gas stream into the liquid stream;
controlling an amount of bubbling of the feed gas to a selected portion; and
redirecting the slip gas from the membrane contactor back to the feed gas stream.

10. The method of claim 9, wherein the liquid absorbent includes an amine based component for selectively removing $H_2S$ and $CO_2$ from the feed gas stream.

11. The method of claim 9, controlling a liquid level within the membrane contactor to maintain the plurality of membrane fibers immersed in the liquid absorbent stream.

* * * * *